Figure 1:
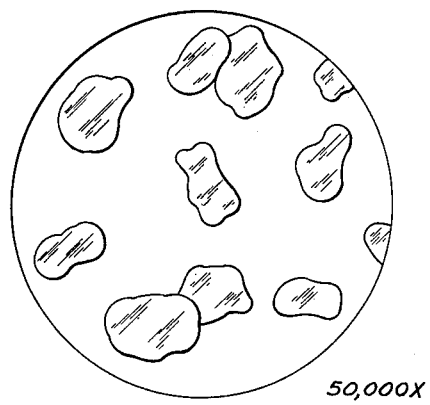

United States Patent Office 3,141,788
Patented July 21, 1964

3,141,788
TITANIUM DIOXIDE PIGMENTS
Walter R. Whately, Lynchburg, Va., assignor to American Cyanamid Company, Stamford, Conn., a corporation of Maine
Filed Oct. 5, 1962, Ser. No. 228,593
17 Claims. (Cl. 106—300)

The present invention relates to titanium dioxide pigment of improved chalk resistance and the processes for the manufacture thereof.

Paint, enamel and lacquer films containing ordinary (untreated) titanium dioxide pigment undergo rapid disintegration during outdoor weathering, and this pigment is therefore commonly said to possess "poor chalk resistance." The disintegration takes place continuously at the surface of the films, resulting in continuous release of titanium dioxide pigment which gives the films a powdery or chalky appearance during their lives.

The ultimate cause of this disintegration is sunlight, but the immediate cause is not known. However, it is generally believed that a photo-oxidation step is involved in which the pigment acts as catalyst (cf. Barksdale, "Titanium," New York, N.Y., 1949, chapt. 15, and Whately, U.S. Patent No. 2,671,031 of 1954).

The poor weatherability imparted to films by titanium dioxide is perhaps the single most disadvantageous property of this pigment, and a major technical effort has been made to improve the pigment in this regard; cf. Gardner U.S. Patent No. 1,984,168 (1933), Patterson U.S. Patent No. 2,187,050 (1940), and Miller U.S. Patent No. 2,668,776 (1954).

The discovery has now been made that titanium dioxide pigment is improved as to chalk resistance by the presence of a small amount of a highly particulate insoluble hydrous zirconium phosphate on the particles thereof.

It has further been discovered that the hydrous zirconium phosphate does not mask or inhibit to a significant extent the antichalking properties imparted by polyvalent metal oxides which have heretofore been used for the purpose.

It is not known precisely how the hydrous zirconium phosphate is associated with the pigment so as to improve its chalk resistance. However, a laboratory electron photomicrograph of one preferred pigment according to the present invention has shown that at least a part (and evidently the effective part) of the hydrous zirconium phosphate is present as discrete particles (estimated as $0.01\mu$ in average diameter) on the surface of the pigment, giving the pigment particles (themselves only about $0.2\mu$ to $0.4\mu$ in diameter) a surface roughness or asperity.

The hydrous zirconium phosphates present on the surfaces of pigment of the present invention are a known class of salts. They are gels or gelatinous precipitates containing roughly 10% to 20% by weight of water not removable by drying at 110° C. but removable by calcination, at temperatures up to 500°–1000° C. They may contain minor amounts (less than 5% based on the weight of the $TiO_2$) of cations other than zirconium (for example, titanium, calcium, sodium and aluminum) and anions other than phosphate (for example sulfate, chloride and nitrate), depending on the particular starting materials from which they are prepared.

Titanium dioxide pigment benefited by the present invention may be sulfate-process pigment or pigment produced by combustion of titanium tetrachloride with oxygen.

The pigment of the present invention is most easily prepared by forming an aqueous slurry of titanium dioxide pigment, preferably from which oversized (non-pigmentary) particles have been removed by hydroclassification, and precipitating a small amount of a hydrous zirconium phosphate in said slurry. The hydrous zirconium phosphate precipitates largely as discrete particles of sub-pigmentary dimensions, which at least in a large part form an intimate mixture with the pigment particles as a rough deposit thereon. The reason why the hydrous zirconium phosphate particles deposit themselves on the titanium dioxide pigment particles is not known, and applicants do not wish to be bound by a theory.

The pigment of the present invention is illustrated in the drawing, wherein

Figure 2:
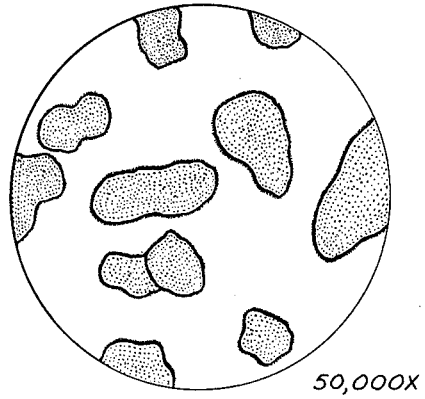

FIGURE 1 is a drawing made from an electron photomicrograph at 50,000 diameters of ordinary untreated titanium dioxide pigment, and FIGURE 2 is a drawing made from an electron photomicrograph at 50,000 diameters of the pigment of FIGURE 1 treated according to the present invention.

In FIGURE 1, the particles (which are titanium dioxide pigment "ultimate" particles about $0.2\mu$–$0.4\mu$ in average dimensions) have smooth and perhaps fused surfaces. In FIGURE 2, the same particles have a rough appearance resulting from the presence of hydrous zirconium phosphate on the surface thereof.

The effectiveness of the hydrous zirconium phosphate does not significantly depend on the temperature at which it is formed, so that the treatment may be undertaken while the pigment slurry is at normal room temperature, with resulting economies.

The hydrous zirconium phosphate is conveniently precipitated by slurrying the titanium dioxide in aqueous medium having a dissolved content of a zirconium salt, for example zirconium sulfate, zirconyl sulfate, zirconium nitrate and mixtures thereof, and adding an aqueous solution of a phosphatic compound. A metathesis takes place causing precipitation of a hydrous zirconium phosphate on the pigment particles. The precipitated hydrous zirconium phosphate is substantially insoluble over the entire pH range. It is insoluble in the substantially neutral pH range of 6–8 and is very difficult to separate mechanically from the pigment. This is an important advantage because the treated slurry may be neutralized, and because the pigment may be washed with water to remove any soluble salts present and subjected to milling in a fluid energy mill to break up the pigment sinters or aggregates which are often present.

In the process, if desired, the amount of phosphatic compound added may be less than that sufficient to precipitate all the zirconium present. In such event, the unprecipitated zirconium need not be lost but is precipitated as a hydrous zirconia when the slurry is neutralized, and adds to the chalk resistance imparted by the hydrous zirconium phosphate.

Moreover, it is within the scope of the invention to add to the slurry hydrolyzable salts of aluminum, tin, titanium, chromium, lead and other metals known to promote chalk resistance, and to precipitate hydrous oxides therefrom before or after hydrous zirconium phosphate has been precipitated in the slurry, or simultaneously therewith. The chalk resistance of these hydrous oxides supplements and does not mask the chalk resistance imparted by the hydrous zirconium phosphate.

However, if desired, the phosphatic compound may be added to the pigment slurry first, and precipitation effected by subsequent addition of the zirconium salt solution. The weight of hydrous zirconium phosphate precipitated in any one instance is readily determined by running the reaction in the absence of pigment, and weighing the precipitate formed. The reaction goes to substantial completion within a few minutes.

The pigment may be treated by forming a slurry of titanium dioxide in an aqueous medium having a dissolved content of a hydrolyzable zirconium halide, for example zirconium tetrachloride, and precipitating at least part of the zirconium therein by adding a phosphatic compound. The slurry can then be neutralized and processed as described.

A particular advantage resulting from the use of zirconium tetrachloride as the source of zirconium in the treatment is that the slurry can be neutralized, at least partially, with a low-cost calcium base, for example calcium hydroxide, calcium bicarbonate, and calcium carbonate, without contamination of the pigment because the neutralization product in such event is calcium chloride which is water-soluble and is removed in the washing step.

The minimum and maximum effective amounts of hydrous zirconium phosphate have not been determined, but very satisfactory results have been obtained in the range of 1% to 3% of hydrous zirconium phosphate calculated as $2ZrO_2 \cdot P_2O_5$ on the $TiO_2$ content of the pigment, and this range is therefore preferred. However, a distinct improvement in chalk resistance has been caused by the presence of 0.1% of the hydrous zirconium phosphate and not more than about 5% has been needed to effect about maximum improvement, so that the invention does not depend primarily upon specific amounts.

The invention will be further illustrated by the examples which are specific preferred embodiments of this invention and which are not to be construed as limitations thereon.

*Example 1*

The following illustrates the preparation of titanium dioxide pigment of improved chalk resistance resulting from the presence of a small amount of an insoluble hydrous zirconium phosphate on the particles thereof.

A slurry containing 20% by weight of rutile titanium dioxide pigment which has been hydroclassified to remove oversized (non-pigmentary) particles is warmed to 30° C. and a 4,000 g. aliquot is removed. To this is added 40 ml. of a solution containing zirconium sulfate $[Zr(SO_4)_2]$ in amount equivalent to 200 g./l. of zirconium dioxide $(ZrO_2)$. There is then added slowly through a dropping funnel with rapid stirring 56 ml. of an aqueous solution containing 100 g./l. of orthophosphoric acid.

The zirconium of the zirconium sulfate is precipitated as a hydrous zirconium phosphate. An electron photomicrograph shows that the precipitated hydrous zirconium phosphate particles are largely uniformly deposited on the surface of the titanium dioxide particles giving the surface a roughened appearance; the diameter of the deposited particles is estimated at about $0.01\mu$. Calculations indicate that the weight of the precipitated hydrous zirconium phosphate, calculated as $2(ZrO_2) \cdot P_2O_5$ is 1.5% of the weight of the titanium dioxide.

The slurry is then neutralized to pH 8.0 with sodium hydroxide and the liquid phase filtered off. The resulting pigment cake is washed to remove sodium sulfate and any other soluble salts present, oven-dried at 110° C., and milled in a fluid energy mill supplied with superheated steam.

The resulting pigment is tested by the method of Examples 3 and 4 of Marcot et al. U.S. Patent No. 2,766,133 (1956) wherein the pigment is formulated into linseed oil and exposed on panels to weathering in a standard laboratory weathering unit in comparison with panels carrying paint prepared in the same way from control (untreated) pigment.

The chalk resistance of the paint carrying the treated pigment is more than about twice the chalk resistance of the paint containing the control pigment, and is about 10% better in this respect than titanium dioxide pigment carrying an equal weight of hydrous titanic phosphate, as disclosed in my copending application Serial No. 76,240, filed on December 16, 1960, now U.S. Patent 3,127,280.

Substantially identical results are obtained when the pigment is treated at 70° C.

*Example 2*

The following illustrates the preparation of titanium dioxide pigment of superior chalk resistance resulting from the presence of small amounts of an insoluble hydrous zirconium phosphate and hydrous alumina on the particles thereof.

The procedure of Example 1 is repeated through the step in which the orthophosphoric acid is added, forming a deposit of hydrous zirconium phosphate on the pigment particles.

There is then added slowly with rapid stirring 160 ml. of an aqueous solution containing 325 g./l. of $Al_2(SO_4)_3$. The slurry is then neutralized to pH 8.0 by addition of aqueous 10% sodium hydroxide, forming a deposit of hydrous alumina on the particles. The slurry is maintained at 70° C. for two hours, and the pigment filtered off. The cake is washed with 8 liters of hot water, dried at 110° C. to a moisture content of <1.0% and jet milled.

At the end of 600 hours in accelerated weathering instrument, paint pigmented with the pigment thus obtained has a chalk resistance 120% better than the chalk resistance of paint formulated with control (untreated) pigment.

*Example 3*

To 4,000 g. of an aliquot corresponding to that used for Example 1 at 20° C. is added with rapid stirring 40 g. of a 47.5% by weight solution of zirconium tetrachloride in water, followed by 230 cc. of a 10% by weight solution of $Na_3PO_4 \cdot 12H_2O$. Stirring is continued for 30 minutes. Substantially all of the zirconium of the zirconium tetrachloride precipitates as a hydrous zirconium phosphate. The slurry is neutralized with aqueous sodium hydroxide, and the pigment is washed and jet milled as described in Example 1. The chalk resistance of the finished pigment is substantially the same as that of the pigment product of Example 1.

*Example 4*

The process of Example 3 is repeated, except that the slurry is neutralized to about pH 6 with lime, the final adjustment to pH 7 being made with sodium hydroxide solution.

Substantially the same pigment is obtained.

I claim:

1. Titanium dioxide pigment of improved chalk resistance resulting from the presence of a small amount within the range of about 0.1% to 5% by weight of an insoluble hydrous zirconium phosphate on the particles thereof.

2. Pigment according to claim 1 wherein the weight of said phosphate calculated as $2(ZrO_2) \cdot P_2O_5$ is between 1% and 3% of the weight of the $TiO_2$ content of said pigment.

3. Titanium dioxide pigment of improved chalk resistance resulting from the presence of small amounts within the range of about 0.1% to 5% by weight of an insoluble hydrous zirconium phosphate and hydrous zirconia on the particles thereof.

4. Titanium dioxide pigment of improved chalk resistance resulting from the presence of small amounts within the range of about 0.1% to 5% by weight of an insoluble hydrous zirconium phosphate and an insoluble hydrous alumina on the particles thereof.

5. A process for the manufacture of titanium dioxide pigment of improved chalk resistance, which comprises forming an aqueous slurry of titanium dioxide pigment and precipitating a small amount within the range of about 0.1% to 5% by weight of a hydrous zirconium phosphate in said slurry.

6. A process for the manufacture of titanium dioxide pigment of improved chalk resistance, which comprises forming a slurry of titanium dioxide pigment in aqueous medium having a dissolved content of a zirconium salt, adding a sufficient amount of an aqueous solution of water-soluble phosphatic compound to precipitate a small amount within the range of about 0.1% to 5% by weight of a hydrous zirconium phosphate, neutralizing said slurry, and washing said pigment to remove soluble salts therefrom.

7. A process according to claim 6 wherein the added phosphatic compound is orthophosphoric acid.

8. A process according to claim 6 wherein the added phosphatic compound is trisodium phosphate.

9. A process for the manufacture of titanium dioxide pigment of improved chalk resistance, which comprises forming an aqueous slurry of titanium dioxide pigment having a small content of a zirconium salt, adding a water-soluble phosphatic compound in amount sufficient to precipitate a part but not all of the zirconium of said zirconium salt as hydrous zirconium phosphate the amount so precipitated being within the range of about 0.1% to 5% by weight of the $TiO_2$ content of the pigment and neutralizing said slurry, thereby precipitating the remainder of the zirconium of said zirconium salts as hydrous zirconia.

10. A process for the manufacture of titanium dioxide pigment of improved chalk resistance, which comprises forming an aqueous slurry of titanium dioxide pigment, precipitating a small amount within the range of about 0.1% to 5% by weight of a hydrous zirconium phosphate in said slurry, and, in a subsequent step, jet milling said pigment.

11. A process for the manufacture of titanium dioxide pigment of improved chalk resistance, which comprises forming a slurry of titanium dioxide pigment in aqueous medium having a dissolved content of zirconium tetrachloride, adding a water-soluble phosphatic compound in amount sufficient to precipitate a small amount of the zirconium of said zirconium tetrachloride as hydrous zirconium phosphate the amount so precipitated being within the range of about 0.1% to 5% by weight of the $TiO_2$ content of the pigment, and neutralizing said slurry.

12. A process according to claim 11 wherein the slurry is neutralized by addition of a calcium base.

13. A process for the manufacture of titanium dioxide pigment of improved chalk resistance which comprises forming an aqueous slurry of titanium dioxide pigment having a small dissolved content of a zirconium salt, precipitating on said pigment a part of the zirconium within the range of about 0.1% to 5% by weight of said zirconium salt as hydrous zirconium phosphate by the addition of a water-soluble phosphatic compound, adding a water-soluble aluminum salt, and neutralizing said slurry.

14. Titanium dioxide pigment of improved chalk resistance resulting from the presence of chalk resistance imparting amounts of an insoluble hydrous zirconium phosphate on the particles thereof.

15. Titanium dioxide pigment of improved chalk resistance resulting from the presence of chalk resistance imparting amounts of an insoluble hydrous zirconium phosphate and hydrous zirconia on the particles thereof.

16. Titanium dioxide pigment of improved chalk resistance resulting from the presence of chalk resistance imparting amounts of an insoluble hydrous zirconium phosphate and an insoluble hydrous alumina on the particles thereof.

17. A process for the manufacture of $TiO_2$ pigment of improved chalk resistance, which comprises forming an aqueous slurry of $TiO_2$ pigment having a small content of a zirconium salt, adding a water-soluble phosphatic compound in amount sufficient to precipitate a part but not all of the zirconium of said zirconium salt, the quantity of the zirconium so precipitated being at least about 0.1% hydrous zirconium phosphate based on the weight of the pigment, and neutralizing said slurry, thereby precipitating the remainder of the zirconium of said zirconium salt as hydrous zirconia.

References Cited in the file of this patent

UNITED STATES PATENTS

| | | |
|---|---|---|
| 2,187,050 | Patterson | Jan. 16, 1940 |
| 2,668,776 | Miller | Feb. 9, 1954 |
| 2,671,031 | Whately | Mar. 2, 1954 |
| 2,817,595 | Kalinowski | Dec. 24, 1957 |